United States Patent
Shaw

(10) Patent No.: US 11,820,492 B1
(45) Date of Patent: Nov. 21, 2023

(54) SYSTEM OF CROSS-CHANNEL COMMUNICATION FOR EFFECTORS IN AN ELECTRIC AIRCRAFT

(71) Applicant: BETA AIR, LLC, South Burlington, VT (US)

(72) Inventor: Michael Shaw, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 18/096,775

(22) Filed: Jan. 13, 2023

(51) Int. Cl.
| B64C 13/50 | (2006.01) |
| B60L 3/12 | (2006.01) |
| H04L 12/40 | (2006.01) |

(52) U.S. Cl.
CPC ............ B64C 13/503 (2013.01); B60L 3/12 (2013.01); *B60L 2200/10* (2013.01); *H04L 2012/40215* (2013.01)

(58) Field of Classification Search
CPC ...... B64C 13/503; B60L 3/12; B60L 2200/10; H04L 2012/40215
See application file for complete search history.

(56) References Cited

U.S. PATENT DOCUMENTS

| 6,330,483 B1 * | 12/2001 | Dailey ................. G05B 13/024 |
| | | 700/89 |
| 8,185,255 B2 | 5/2012 | Lavretsky |
| 8,453,160 B2 | 5/2013 | Sunderland |
| 2016/0032866 A1 * | 2/2016 | Cameron ................... F02K 1/76 |
| | | 239/265.19 |
| 2017/0355449 A1 | 12/2017 | Bapat |
| 2022/0227483 A1 * | 7/2022 | Scanlan ............... G05D 1/0077 |
| 2022/0274695 A1 * | 9/2022 | Moore .................... B64C 11/48 |
| 2022/0350347 A1 * | 11/2022 | Hagerott ............. G05D 1/0825 |

FOREIGN PATENT DOCUMENTS

| CN | 104122896 B | 3/2017 |
| CN | 206481103 U | 9/2017 |
| CN | 109799696 A | 5/2019 |

* cited by examiner

*Primary Examiner* — Russell Frejd
(74) *Attorney, Agent, or Firm* — CALDWELL INTELLECTUAL PROPERTY LAW

(57) ABSTRACT

A system for cross-channel communication for effectors in an electric aircraft is presented. The system may include a flight component of an electric aircraft. The system may include a plurality of effectors, wherein the plurality of effectors may be configured to control the flight component. The system may include a plurality of flight controllers communicatively connected to the plurality of effectors, wherein the plurality of flight controllers may be configured to receive an input, generate a command as a function of the input and transmit the command to the plurality of effectors. The system may include a plurality of networks communicatively connected to the plurality of effectors and the plurality of flight controllers, wherein the plurality of networks may be configured to receive the command from the plurality of flight controllers and transmit the command to the plurality of effectors.

18 Claims, 10 Drawing Sheets

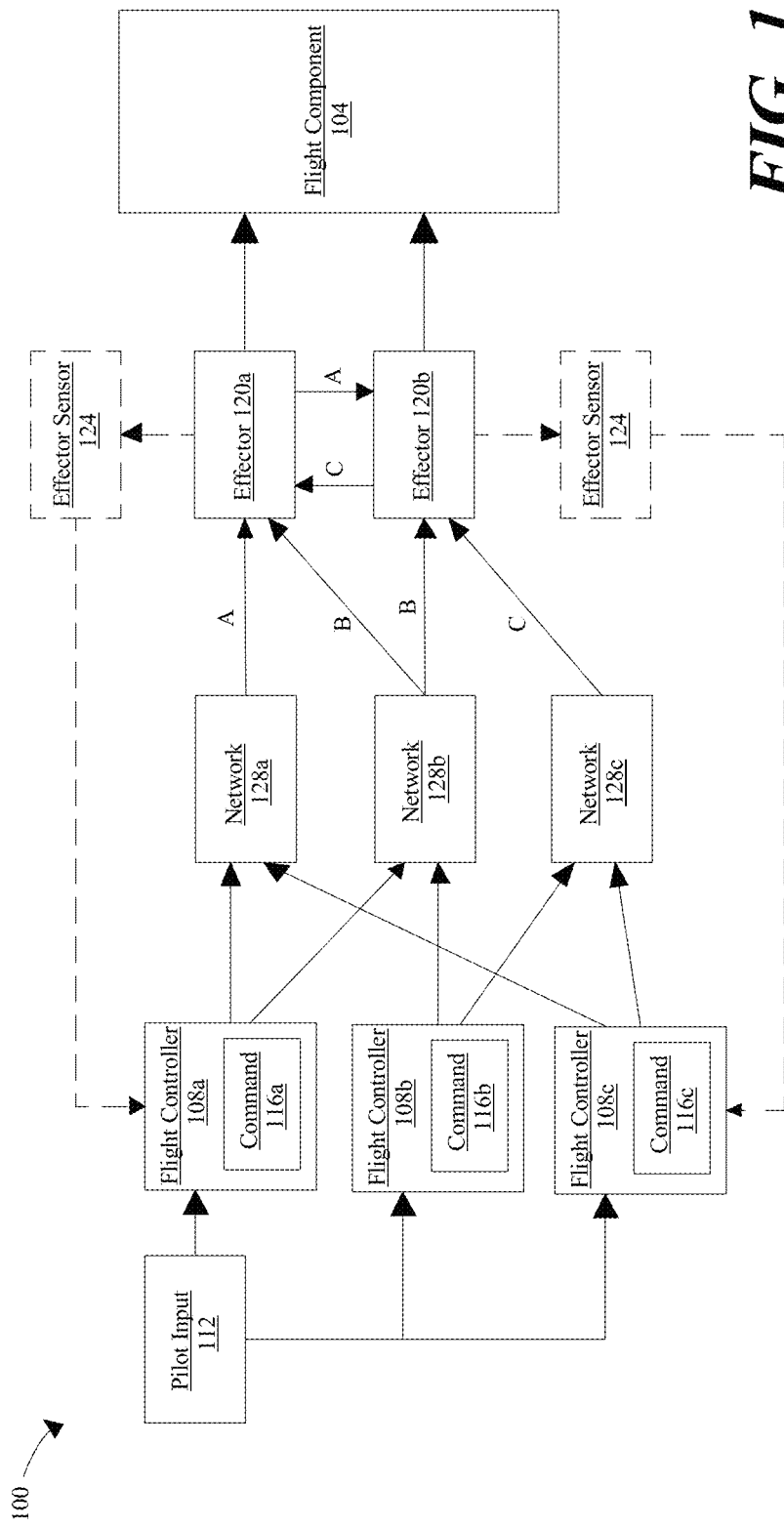

SYSTEM OF CROSS-CHANNEL COMMUNICATION FOR EFFECTORS IN AN ELECTRIC AIRCRAFT

FIELD OF THE INVENTION

The present invention generally relates to the field of electric aircraft. In particular, the present invention is directed to cross-channel communication for effectors in an electric aircraft.

BACKGROUND

In the operation of aircraft, it is essential for all components of the aircraft to remain fully functional in order for the aircraft to safely take off, maneuver, and land. During some flights, a component of the aircraft may experience a malfunction or failure, which will put the aircraft in an unsafe mode and compromise the safety of the aircraft, passengers, and onboard cargo. Existing solutions to mitigating this issue are not sufficient.

SUMMARY OF THE DISCLOSURE

In an aspect, a system for cross-channel communication for effectors in an electric aircraft is presented. The system may include a flight component of an electric aircraft. The system may include a plurality of effectors, wherein the plurality of effectors may be configured to control the flight component. The system may include a plurality of flight controllers communicatively connected to the plurality of effectors, wherein the plurality of flight controllers may be configured to receive an input, generate a command as a function of the input and transmit the command to the plurality of effectors. The system may include a plurality of networks communicatively connected to the plurality of effectors and the plurality of flight controllers, wherein the plurality of networks may be configured to receive the command from the plurality of flight controllers and transmit the command to the plurality of effectors.

In another aspect, a method of cross-channel communication for effectors in an electric aircraft is disclosed. The method may include receiving, using a plurality of flight controllers, an input. The method may include generating, using the plurality of flight controllers, a command as a function of the input. The method may include communicatively connecting, using a plurality of network devices, the plurality of flight controller and a plurality of effectors. The method may include transmitting, using the plurality of network devices, the command from the plurality of flight controllers to the plurality of effectors.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a block diagram illustrating an exemplary embodiment of a system of cross-channel communication for effectors in an electric aircraft;

Figure 2A:
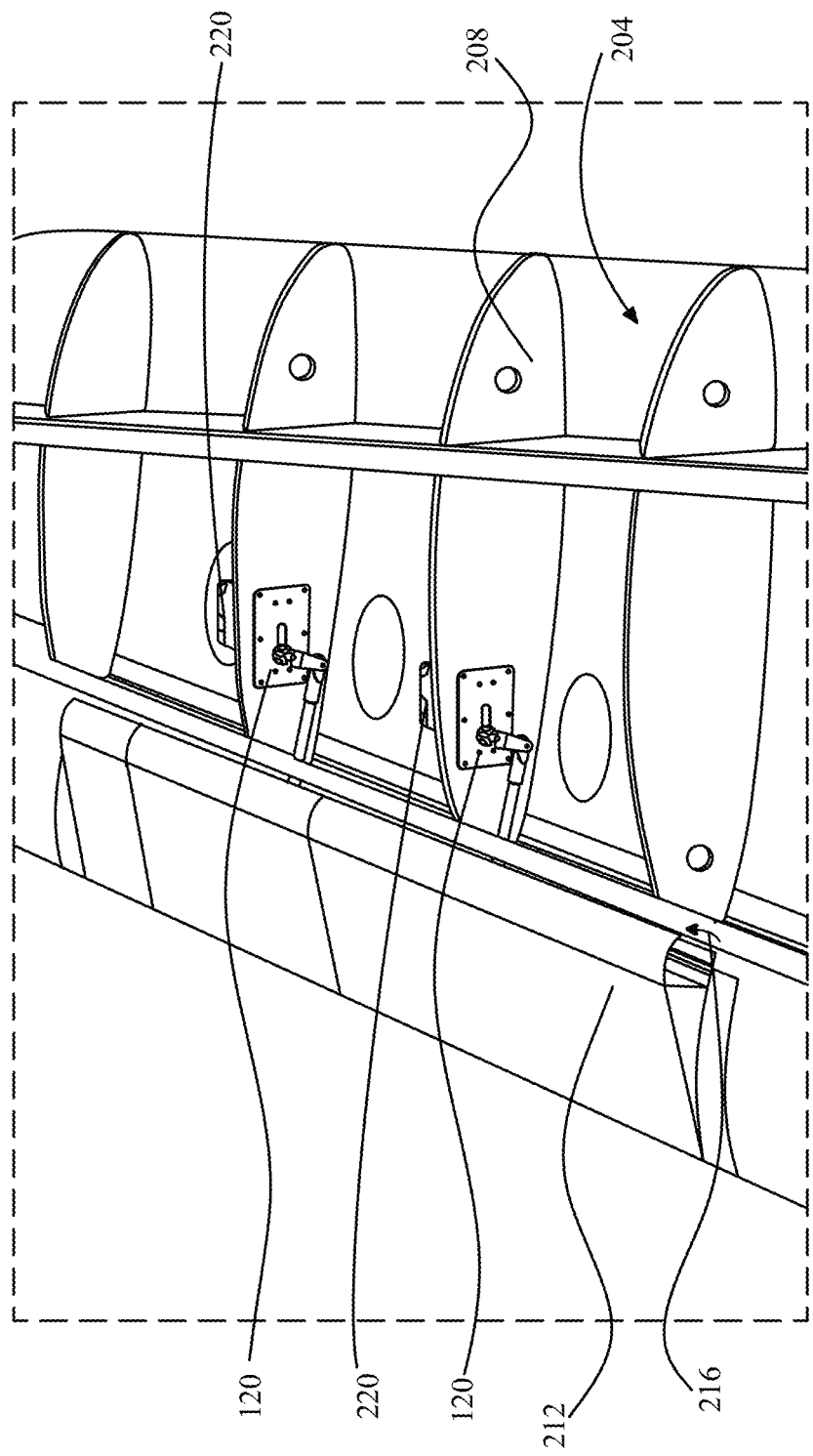
FIGS. 2A-2D are various diagrammatic representations of exemplary effectors in use in an aircraft in accordance with aspects of the invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a system for cross-channel communication for effectors in an electric aircraft. The system may include a flight component of an electric aircraft. The system may include a plurality of effectors, wherein the plurality of effectors may be configured to control the flight component. The system may include a plurality of flight controllers communicatively connected to the plurality of effectors, wherein the plurality of flight controllers may be configured to receive an input, generate a command as a function of the input and transmit the command to the plurality of effectors. The system may include a plurality of networks communicatively connected to the plurality of effectors and the plurality of flight controllers, wherein the plurality of networks may be configured to receive the command from the plurality of flight controllers and transmit the command to the plurality of effectors. Exemplary embodiments illustrating aspects of the present disclosure are described below in the context of several specific examples.

Referring now to FIG. 1, an exemplary bock diagram of system 100 of cross-channel communication for effectors in an electric vehicle. In some embodiments, system 100 may include flight component 104. As used in this disclosure, "flight component" is a component that promotes flight and guidance of an aircraft. In an embodiment, system 100 may include one flight component 104. As a non-limiting example, system 100 may include one electric motor. In another embodiment, system 100 may include a plurality of flight components 104. As a non-limiting example, system 100 may include four flaps of the electric vehicle.

With continued reference to FIG. 1, in some embodiments, flight component 104 may include a control surface of an electric vehicle. A "control surface," as described in this disclosure, is any aerodynamic surface attached to an aircraft and that interacts with forces to move the aircraft. The control surface may include, as a non-limiting example, ailerons, flaps, leading edge flaps, rudders, elevators, spoilers, slats, stabilizers, stabilators, airfoils, a combination thereof, or any other moveable surface used to control an aircraft in a fluid medium. An "aileron," as used in this disclosure, is a hinged surface which forms part of the trailing edge of a wing in a fixed-wing aircraft, and which may be moved with mechanical means such as without limitation servomotors, mechanical linkages, or the like. As a non-limiting example, the aileron may include single acting ailerons, wingtip ailerons, Frise ailerons, differential ailerons. In an embodiment, aileron may be located on an outer wing of aircraft. In another embodiment, the aileron may be located on inner wing of an aircraft. In an embodiment, aileron may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. In some embodiments, an aircraft may use one or more ailerons; this may allow for redundancy so that a second aileron may remain functional in the event a first aileron fails. In some embodiments, aileron may use torque. As used in this disclosure, a "torque" is a measure of force that causes an object to rotate about an axis in a direction. For example, and without limitation, torque may rotate an aileron to generate a force that may adjust and/or affect altitude, airspeed velocity, groundspeed velocity, direction during flight, and/or thrust.

With continued reference to FIG. 1, in some embodiments, a control surface may include a flap. As used in this disclosure, a "flap" is a high-lift device on a trailing edge of an aircraft wing used to reduce stalling speed of an aircraft wing at a given weight. A "high-lift device," for the purposes of this disclosure, is a component or mechanism on an aircraft's wing that increases amount of lift produced by the wing. The device may be a fixed component, or a movable mechanism which is deployed when required. Common movable high-lift devices may include wing flaps and slats. A "slat," for the purposes of this disclosure, is a high-lift device on a leading edge of an aircraft wing used to allow the wing to produce more lift. The fixed devices may include leading-edge slots, leading edge root extensions, and boundary layer control systems. The flaps, as a non-limiting example, may include plain flaps, split flap, slotted flaps, fowler flaps, leading-edge flap, continuous trailing-edge flap, and the like thereof. "Plain flaps," as used in this disclosure, are a hinged portion of a trailing edge, which increase curvature of a wing and lift by lowering the trailing edge of the wing. "Split flaps," as used in this disclosure, are hinged at bottom of a wing. The split flaps may generate drag by disturbing airflow on the underside of a wing. "Slotted flaps," as used in this disclosure, are similar to plain flap, but have a slot between trailing edge of a wing and a flap. Slotted flaps may allow high-energy air to flow from underneath a wing up and over a flap to help prevent airflow separation. "Flow separation," as used in this disclosure, is a detachment of a boundary layer from a surface into a wake. "Fowler flaps," as used in this disclosure, are flaps that move rearward and downward increasing wing area and curvature. In some embodiments, extending the flaps may increase the camber of a wing, raising maximum lift coefficient or upper limit to a lift a wing can generate. This may allow aircraft to generate the required lift at a lower speed, reducing stall speed. A "camber" of a wing, as used in this disclosure, is a convexity of a curve of an airfoil from a leading edge to a trailing edge. "Stall speed," as used in this disclosure, is the minimum speed at which an aircraft must fly to produce a lift. A "stall," as used in this disclosure, is a reduction in lift coefficient generated by an airfoil as angle of attack increases. The stall may occur when the critical angle of attack of an airfoil is exceeded. "Critical angle of attack," as used in this disclosure, is angle of attack which produces maximum lift coefficient. In an embodiment, an aircraft's weight, acceleration, altitude may affect stall speed.

With continued reference to FIG. 1, in some embodiments, a control surface may include an elevator. An "elevator," as used in this disclosure, is a primary flight control surface that controls movement about the lateral axis of an aircraft, wherein the movement may be but not limited to pitch. In an embodiment, an aircraft may include one elevator. In another embodiment, the aircraft may include two or more elevators. In an embodiment, elevator may deflect downward. In another embodiment, elevator may deflect upward. In an embodiment, two or more elevators may deflect synchronously and/or symmetrically. In another embodiment, two or more elevators may deflect asynchronously and/or unsymmetrically. As a non-limiting example, one elevator may deflect upward while another elevator deflects downward. As another non-limiting example, an aircraft may have provisions to disconnect the each of elevators from one another in the event of a control surface jam. Additional disclosure related to an elevator may be found in U.S. patent application Ser. No. 18/095,776 and entitled "A SYSTEM OF AN ELECTRIC AIRCRAFT WITH PITCH CONTROL USING AN ELEVATOR" the entirety of which is incorporated by reference herein in its entirety.

With continued reference to FIG. 1, in some embodiments, a control surface may include an aircraft stabilizer. An "aircraft stabilizer", as used in this disclosure, is an aerodynamic surface, typically including one or more movable control surfaces, that provides longitudinal (pitch) such as but not limited to a horizontal stabilizer and/or directional (yaw) such as but not limited to a vertical stabilizer stability and control. A stabilizer may feature a fixed or adjustable structure on which any movable control surfaces are hinged, or it may itself be a fully movable surface such as a stabilator.

With continued reference to FIG. 1, in some embodiments, flight component 104 may include a propulsor. A "propulsor," as used in this disclosure, is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In some embodiments, flight component 104 may include a lift propulsor component. As used in this disclosure a "lift propulsor component" is a component and/or device used to propel a craft upward by exerting downward force on a fluid medium, which may include a gaseous medium such as air or a liquid medium such as water. The lift propulsor component may include any device or component that consumes electrical power on demand to propel an electric aircraft in a direction or other vehicle while on ground or in-flight. For example, and without limitation, the lift propulsor component may include a rotor, propeller, paddle wheel and the like thereof, wherein a rotor is a component that produces torque along the longitudinal axis, and a propeller produces torquer along the vertical axis. In an embodiment, a propulsor may include a puller component. As used in this disclosure, a "puller component" is a component that pulls and/or tows an aircraft through a medium. As a non-limiting example, a puller component may include flight component 104 such as a puller propeller, a puller motor, a puller propulsor, and the like. Additionally, or alternatively, a puller component may include a plurality of puller flight components. In another embodiment, propulsor component may include a pusher component. As used in this disclosure a "pusher component" is a component that pushes and/or thrusts an aircraft through a medium. As a non-limiting example, a pusher component may include flight component 104 such as a pusher propeller, a pusher motor, a pusher propulsor, and the like. Additionally, or alternatively, pusher flight component may include a plurality of pusher flight components.

With continued reference to FIG. 1, in another embodiment, a propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

With continued reference to FIG. 1, in some embodiments, a propulsor may include an electric motor. As used in this disclosure, "electric motor" is a device that converts electrical energy into mechanical energy, for instance by causing a shaft to rotate. The electric motor may be driven by direct current (DC) electric power; for instance, a motor may include a brushed DC motor or the like. An electric motor may be driven by electric power having varying or reversing voltage levels, such as alternating current (AC) power as produced by an alternating current generator and/or inverter, or otherwise varying power. An electric motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that an electric motor may take or exemplify as consistent with this disclosure.

With continued reference to FIG. 1, in some embodiments, system 100 may include a flight controller 108. As used in this disclosure a "flight controller" is a computing device of a plurality of computing devices dedicated to data storage, security, distribution of traffic for load balancing, and flight instruction. In some embodiments, flight controller 108 may include and/or communicate with any computing device including and without limitation a microcontroller, microprocessor, digital signal processor (DSP) and/or system on a chip (SoC) as described in this disclosure. A computing device herein is disclosed further in detail with respect to FIG. 7. Further, in some embodiments, flight controller 108 may include a single computing device operating independently, or may include two or more computing device operating in concert, in parallel, sequentially or the like; two or more computing devices may be included together in a single computing device or in two or more computing devices. In embodiments, flight controller 108 may be installed in an aircraft, may control the aircraft remotely, and/or may include an element installed in the aircraft and a remote element in communication therewith. Flight controller 108 may be described in further detail with respect to FIG. 5. In an embodiment, system 100 may include one flight controller 108. In another embodiment, system 100 may include a plurality of flight controllers 108, such as but not limited to flight controller 108a, flight controller 108b and flight controller 108c.

With continued reference to FIG. 1, in some embodiments, a plurality of flight controllers 108 may include a master bus controller. As used in this disclosure a "master bus controller" is a controller that performs bus mastering. "Bus mastering," as used in this disclosure, is a feature of bus architectures that enables a device connected to a bus to initiate direct memory access (DMA) transactions. "Direct memory access," as used in this disclosure, is a feature of computer systems and allows hardware subsystems to access main system memory independently of the central processing unit (CPU). Direct memory access may allow CPU to perform other operations while a transfer, such as but not limited to data transfer, is in progress. A bus disclosed herein is disclosed further in detail below. In an embodiment, master bus controller may communicate using synchronous and/or asynchronous bus control protocols. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example, and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces.

With continued reference to FIG. 1, in some embodiments, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

With continued reference to FIG. 1, in some embodiments, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

With continued reference to FIG. 1, in some embodiments, a plurality of flight controllers 108 may receive an input. In some embodiments, the input may include pilot input 112. A "pilot input," as used in this disclosure, is an input obtained from an operator of a vehicle. An "operator," a person who uses, causes to be used, or authorizes to be used an aircraft, with or without the right of legal control (as owner, lessee, or otherwise), for the purpose of air navigation including the piloting of aircraft, or on any part of the surface of an airport. As a non-limiting example, the operator may be an aircraft pilot, co-pilot, and the like. In an embodiment, pilot input 112 may be generated when an operator controls an aircraft about its principal axis. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently. In another embodiment, pilot input 112 may be obtained by adjusting one or more angles of attack of a propeller. As used in this disclosure an "angle of attack" is an angle between the chord of the propeller and the relative wind. For example, and without limitation angle of attack may include a propeller blade angled 3.2°. In an embodiment, pilot input 112 may modify the variable pitch angle from a first angle of 2.71° to a second angle of 3.52°.

With continued reference to FIG. 1, in some embodiments, pilot input 112 may be obtained by maneuvering a pilot interfacing component. A "pilot interfacing component," as used in this disclosure, is a component of an aircraft that a pilot maneuvers to control the aircraft. The pilot interfacing component may be physically located in the cockpit of an aircraft or remotely located outside of the aircraft in another location communicatively connected to at least a portion of aircraft. A "cockpit," as used in this disclosure, is the area from which a pilot controls an aircraft. The cockpit may be in the front, top, bottom, aft, left, right, the combination of thereof, and the like of an aircraft. As a non-limiting example, the pilot interfacing component may be a lift lever, a flap handle, a control stick, a rudder pedal, a yoke, an engine control quadrant, or the like. A "lift lever," as used in this disclosure, is a lever that controls the lift of an electric aircraft. As a non-limiting example, pilot input 112 may include an input generated when a pilot pushes a lift lever to increase a lift. For example and without limitation, a lift lever herein may be consistent with a lift lever disclosed in U.S. patent application Ser. No. 18/095,776 and entitled "A SYSTEM OF AN ELECTRIC AIRCRAFT WITH PITCH CONTROL USING AN ELEVATOR" the entirety of which is incorporated by reference herein in its entirety. A "yoke," as used in this disclosure, is a pilot interfacing component that is used to adjust the attitude of an aircraft. The yoke may control an aileron. The yoke may be shaped like without limitation, a W, U, M, a ram's horn, or the like. The yoke may allow the pilot to move the aircraft "up," "down," "over left," and "over right." Twisting the yoke side to side may control roll and pitch. Pushing forward on the yoke may direct the nose of the airplane towards the ground and pulling back on it may command the nose to pull up. As a non-limiting example, pilot input 112 may include an input generated when a pilot pushes a yoke to pitch down an aircraft. A "control stick," as used in this disclosure, is a stick that allows a pilot to control the attitude and altitude of an aircraft. The control stick may be called a joystick. As a non-limiting example, the control stick may include a side stick, a center stick, or the like. The control stick may be used in replacement of the yoke. An "engine control quadrant," as used in this disclosure, is an operation unit to operate an engine, such as but not limited to an aircraft engine, with any relevant controls grouped together. In an embodiment, the engine control quadrant may include a throttle. A "throttle," as used in this disclosure, is an engine power control of an aircraft, which may be similar to a gas pedal in a car. The throttle may be a push-pull device or a lever. The throttle may adjust the amount of fuel and air mixture to add or subtract power to the aircraft engine. In another embodiment, the engine control quadrant may include a propeller control. A "propeller control," as used in this disclosure, is a controller that operates a propeller RPM. A "propeller RPM," as used in this disclosure, is a measure of speed of a propeller. As a non-limiting example, the propeller control may control the propeller RPM from 2700 rpm to 1800 rpm. A "flap handle," as used in this disclosure, is a control switch that controls a flap. The flap handle may adjust a flap to increase a lift or a drag. The flap handle may be used during takeoff, approach, and/or landing. A "rudder pedal," as used in this disclosure, is a control pedal that controls a rudder. A "rudder," as used in this disclosure, is a flight control surface which controls rotation about the vertical axis of an aircraft. The rudder may be a movable surface that is mounted on the trailing edge of the vertical stabilizer or fin.

With continued reference to FIG. 1, in some embodiments, pilot input 112 may include information or raw data gathered from gyroscopes, inertial measurement units (IMUs), motion sensors, a combination thereof, or another sensor or grouping of sensors. In some embodiments, pilot input 112 may be exterior sensor data, interior sensor data, data retrieved from one or more remotely or onboard computing devices.

With continued reference to FIG. 1, in some embodiments, a plurality of flight controllers 108 may receive an input from a sensor. A "sensor," as used in this disclosure, is a device that produces an output signal for the purpose of sensing a physical phenomenon. The sensor may be located inside an aircraft; and/or be included in and/or attached to at least a portion of the aircraft. The sensor may be mechanically and/or communicatively coupled to a pilot interfacing component. Mechanically coupled disclosed herein is described below. "Communicatively connected," as used in this disclosure, means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, in some embodiments, the sensor may be configured to sense a characteristic associated with any pilot input 112 described in this disclosure. Non-limiting examples of the sensor may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, the sensor may sense a characteristic as an analog measurement, for instance, yielding a continuously variable electrical potential indicative of the sensed characteristic. In these cases, the sensor may additionally comprise an analog to digital converter (ADC) as well as any additional circuitry, such as without limitation a Whetstone bridge, an amplifier, a filter, and the like. For instance, in some cases, the sensor may comprise a strain gage configured to determine loading of one or flight components 104, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted to other systems within an aircraft, for instance without limitation a computing system, a pilot display, and a memory component. Alternatively or additionally, the sensor may sense a characteristic of pilot input 112 digitally. For instance, in some embodiments, the sensor may sense a characteristic through a digital means or digitize a sensed signal natively. In some cases, for example, the sensor may include a rotational encoder and be configured to sense a rotational position of an aircraft; in this case, the rotational encoder digitally may sense rotational "clicks" by any known method, such as without limitation magnetically, optically, and the like.

With continued reference to FIG. 1, in some embodiments, a plurality of flight controllers 108 may be configured to generate command 116 as a function of an input. The input may be without limitation pilot input 112. A "command," as used in this disclosure, is an authoritative order to operate a device, such as but not limited to flight component 104. In some embodiments, command 116 may include an attitude command. "Attitude command," as used in this disclosure, is a command that controls an attitude of an electric aircraft. As a non-limiting example, attitude command may indicate a pilot's desire to change an aircraft's pitch, roll, or yaw. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. In some embodiments, command 116 may be an electrical signal. As a non-limiting example, electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal.

With continued reference to FIG. 1, in some embodiments, a plurality of flight controllers 108 may generate command 116 using a lookup table. A "lookup table," for the purposes of this disclosure, is an array of data that maps input values to output values. As a non-limiting example, the input values may be pilot input 112, such as without limitation turning a yoke of an electric aircraft, the output values may be deflection degree of an aileron. A lookup table may be used to replace a runtime computation with an array indexing operation. In another embodiment, the plurality of flight controllers 108 may generate a command using a command machine learning module. A "command machine learning model," as disclosed herein, is a is a machine-learning model, such as a mathematical model, neural net, or program generated by a machine learning algorithm known as a "classification algorithm," that sorts inputs from a flight controller into categories or bins of data, outputting the categories or bins of data and/or labels associated therewith. As a non-limiting example, inputs of the command machine learning model may include pilot input 112, such as but not limited to yoke control, throttle control, manual input value of propulsor RPM, and the like. As another non-limiting example, outputs of the command machine learning model may include attitude command, such as but not limited to pitch control by deflecting an elevator, increasing fuel mixture by adjusting a throttle, and the like. Additionally and without limitation, a command machine-learning model may be consistent with a machine-learning model disclosed in FIG. 6.

With continued reference to FIG. 1, in some embodiments, command 116 may be manually put by an operator. "Manual input," as used in this disclosure, is data manually created by a human. In some embodiments, manual input may be created using a keyboard, mouse, trackball, microphone or other electromechanical input device. As a non-limiting example, manual input may include pilot voice data, wherein the pilot voice data may include a voice command by a pilot to a microphone and/or computing system. As another non-limiting example, manual input may include a propeller rpm value of 2800 rpm manually put using a keyboard by an operator. As another non-limiting example, manual input may include a command to deflect an aileron downward generated by clicking a computer system.

With continued reference to FIG. 1, in some embodiments, flight controller 108 may transmit command 116 to effector 120. An "effector," as used in this disclosure, is a component of a machine that is responsible for moving and/or controlling a mechanism or system. In some embodiments, effector 120 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, effector 120 may have an energy or power source other than control signal. This may include a main energy source, which may include for example electric power, hydraulic power, pneumatic power, mechanical power, and the like. In some cases, upon receiving a control signal, effector 120 may respond by converting source power into mechanical motion. In some cases, effector 120 may be understood as a form of automation or automatic control.

With continued reference to FIG. 1, in some embodiments, an energy source may include a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

With continued reference to FIG. 1, in another embodiment, an energy source may be used to provide a steady supply of electrical power to a load over a flight by an electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

With continued reference to FIG. 1, in some embodiments, an energy source may include a plurality of energy sources, referred to herein as a module of energy sources. The module may include batteries connected in parallel or in series or a plurality of modules connected either in series or in parallel designed to satisfy both power and energy requirements. Connecting batteries in series may increase the potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. The energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

With continued reference to FIG. 1, in some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

With continued reference to FIG. 1, in some embodiments, effector 120 may include an actuator. As used in this disclosure, an "actuator" is a component that controls a control surface of an electric aircraft. In some embodiments, the actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move. In some embodiments, the actuator may include hydraulic pistons. A configuration of hydraulic piston may be seen in FIG. 2A-D. In some embodiments, the actuator may each include a hydraulic piston that extends or retracts to actuate flight components 104. In some embodiments, the actuator may be triggered by hydraulic pressure.

With continued reference to FIG. 1, in some embodiments, an actuator may include a pneumatic actuator. In some cases, a pneumatic actuator may enable considerable forces to be produced from relatively small changes in gas pressure. In some cases, the pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds. In some embodiments, the actuator may include pneumatic pistons. In another example, the actuator may include a solenoid. In some embodiments, the actuator may be triggered by pneumatic pressure.

With continued reference to FIG. 1, in some cases, an actuator may include an electric actuator. The electric actuator may include any electromechanical actuators, linear motors, and the like. In some cases, the actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. The electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

With continued reference to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, in some embodiments, another exemplary actuator may be connected to landing gear. Landing gear may be used for take-off and/or landing. Landing gear may be used to contact ground while aircraft is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

With continued reference to FIG. 1, in some embodiments, effector 120 may include an inverter. An "inverter," as used in this disclosure, is a power electronic device or circuitry that changes direct current (DC) to alternating current (AC). An inverter (also called a power inverter) may be entirely electronic or may include at least a mechanism (such as a rotary apparatus) and electronic circuitry. In some embodiments, static inverters may not use moving parts in conversion process. Inverters may not produce any power itself; rather, inverters may convert power produced by a DC power source. Inverters may often be used in electrical power applications where high currents and voltages are present; circuits that perform a similar function, as inverters, for electronic signals, having relatively low currents and potentials, may be referred to as oscillators. In some cases, circuits that perform opposite functions to an inverter, converting AC to DC, may be referred to as rectifiers. As used in this disclosure, "alternating current" is a flow of electric charge that periodically reverses direction. In some cases, an alternating current may continuously change magnitude overtime; this is in contrast to what may be called a pulsed direct current. Alternatively or additionally, in some cases an alternating current may not continuously vary with time, but instead exhibit a less smooth temporal form. For example, exemplary non-limiting AC waveforms may include a square wave, a triangular wave (i.e., sawtooth), a modifier sine wave, a pulsed sine wave, a pulse width modulated wave, and/or a sine wave. As a further non-limiting example, the inverter may include receiving a first input voltage and outputting a second voltage, wherein the second voltage is different from the first voltage.

With continued reference to FIG. 1, in an embodiment, system 100 may include one effector 120. In another embodiment, system 100 may include a plurality of effectors 120, such as without limitation first effector 120a and second effector 120b. In an embodiment, the plurality of effectors is same effectors 120. As a non-limiting example, first effector 120a and second effector 120b may be inverters. In another embodiment, the plurality of effectors is different effectors 120. As a non-limiting example, first effector 120a may be a pneumatic piston and second effector 120b may be a solenoid.

With continued reference to FIG. 1, in some embodiments, effector 120 may receive command 116 from flight controller 108. In some embodiments, effector 120 may receive command 116 from flight controller 108 and may control flight component 104 as a function of the command 116. In some embodiments, effector 120 may be mechanically and/or communicatively connected to flight component 104 and configured to control flight component 104. As a non-limiting example, an inverter may be communicatively connected to an electric motor of a propulsor and configured to control the electric motor. In an embodiment, mechanical coupling may be used to connect the ends of adjacent parts and/or objects of an electric aircraft. Further, in an embodiment, mechanical coupling may be used to join two pieces of rotating electric aircraft components. In an embodiment, the plurality of effectors 120 may be mechanically and/or communicatively connected to one flight component 104. As a non-limiting example, a plurality of inverters may be connected to an electric motor of a propulsor. In some embodiments, one effector 120 may be mechanically and/or communicatively connected to a plurality of flight components 104. As a non-limiting example, a plurality of inverters may be communicatively connected to one electric motor of a propulsor.

With continued reference to FIG. 1, in some embodiments, flight controller 108 may transmit command 116 to effector 120 using network 128. As used in this disclosure, "network" is a connection system of at least two systems and/or devices to transmit and exchange information with each other. In some embodiments, system 100 may include a plurality of networks 128, such as without limitation network 128a, network 128b and network 128c. In some embodiments, without limitation, network 128 may include any network protocol thereof. In an embodiment, network 128 may include network using an electrical bridging device. An "electrical bridging device" as used in this disclosure, is a component including a metallic strip or bar configured for local high current/voltage power distribution. The electrical bridging device may include and/or be made up of any conductive element. A conductive element may include copper, brass, aluminum, and/or other conductive elements. In some embodiments, the electrical bridging device may include any flexible material. In other embodiments, the electrical bridging device may include a rigid material. The electrical bridging device may include a switchboard and/or switchgear. In some embodiments, the electrical bridging device may be configured to include a curved structure. In some embodiments, the electrical bridging device may include a plurality of curved structures. In some embodiments, the electrical bridging device may include a braided structure. A braided structure may include a plurality of conductive wires that may be wrapped into a single braid. A braided structure may allow for flexibility of the electrical bridging device. In some embodiments, the electrical bridging device may include a laminated structure. The electrical bridging device may include a plurality of layers of laminated materials and/or conductive materials. In a non-limiting example, the electrical bridging device may include a structural frame surrounding a plurality of thin conductor layers. In some embodiments, the electrical bridging device may include a busbar. In some embodiments, the electrical bridging device may include a shape. A shape may include, but is not limited to, a rectangular, hexagonal, circular, square, triangular, and/or other shapes. In some embodiments, the electrical bridging device may include a flat, bar, and/or rod shape. Additionally and without limitation, an electrical bridging device may be consistent with an electrical bridging device found in U.S. patent application Ser. No. 17/564,361 and titled "SYSTEMS AND METHODS FOR LAMINATED BUSWORK WITH FLEXIBLE CONDUCTORS FOR AN ELECTRIC AIRCRAFT," which is incorporated by reference herein in its entirety.

With continued reference to FIG. 1, in some embodiments, an electrical bridging device may include a bus element. For the purposes of this disclosure, a "bus element" is an electrically conductive pathway connecting at least a component in a system configured to convey electrical energy between components. Bus element may include one or more electrically conductive pathways configured to transfer electrical energy across the pathways to convey electrical energy from one component to one or more other components. The bus element may include, without limitation, one or more metallic strips and/or bars. Bus element may include a ring bus. For the purpose of this disclosure, a "ring bus" is a bus element wherein circuit breakers are connected to form a ring with isolators on both sides of each circuit breaker. The ring bus may include a component configured to isolate a fault by tripping two circuit breakers while all other circuits remain in service. The bus element may be disposed in or on a switchgear, panel board, busway enclosure, plurality of energy storage elements, any portion of electric aircraft, plurality of propulsors, or a combination thereof. The bus element may also be used to connect high voltage equipment at electrical switchyards, and low voltage equipment in plurality of energy storage elements. The bus element may be uninsulated; bus element may have sufficient stiffness to be supported in air by insulated pillars. These features allow sufficient cooling of the conductors, and the ability to tap in at various points without creating a new joint. The bus element may include material composition and cross-sectional size configured to conduct electricity where the size and material determine the maximum amount of current that can be safely carried. The bus element may be produced in a plurality of shapes including flat strips, solid bars, rods, or a combination thereof. The bus element may be composed of copper, brass, aluminum as solid or hollow tubes, in embodiments. The bus element may include flexible buses wherein thin conductive layers are sandwiched together; such an arrangement may include a structural frame and/or cabinet configured to provide rigidity to bus element. The bus element may include distribution boards configured to split the electrical supply into separate circuits at one location. Busways, or bus ducts, are long busbars with a protective cover. Rather than branching from the main supply at one location, they allow new circuits to branch off anywhere along the route of the busway. The bus element may either be supported on insulators, or else insulation may completely surround it. Busbars are protected from accidental contact either by an enclosure or by design configured to remove it from reach. The bus element may be connected to each other and to electrical apparatus by bolted, clamped, or welded connections. Joints between high-current bus element sections have precisely machined matching surfaces that are silver-plated to reduce the contact resistance. Additionally and without limitation, a bus element may be consistent with the bus element in U.S. patent application Ser. No. 17/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated by reference herein in its entirety.

With continued reference to FIG. 1, in some embodiments, a bus element may include a controller area network (CAN) bus. A "controller area network bus," as used in this disclosure, is a type of bus that allows microcontrollers and devices to communicate with each other within a vehicle, such as but not limited to an electric aircraft, without a host computer which allows for control and data acquisition. A "network host," as used in this disclosure, is a computer or other device connected to a computer network. A host may work as a server offering information resources, services, and applications to users or other hosts on the network. A "bus," as used in this disclosure, is a device that connects multiple electrical or electronic devices together. The CAN bus may be a multi-master serial bus standard for connecting electronic control units electronic control units (ECU) also known as nodes. A "multi-master bus," as used in this disclosure, is a computer bus in which there are multiple bus master nodes present on the bus. Bus mastering herein is described further in detail above. "Serial communication," as used in this disclosure, is the process of sending data one bit at a time, sequentially, over a communication channel or computer bus. The serial communication is in contrast to parallel communication, where several bits are sent as a whole, on a link with several parallel channels. An "electronic control unit," as used in this disclosure, is an embedded system in electronics that controls one or more of the electrical systems or subsystems in device, such as but not limited to an electric aircraft. The CAN bus may include two or more nodes. A plurality of nodes may interface to devices from simple digital logic e.g. PLD, via FPGA up to an embedded computer running extensive software. The plurality of nodes may be connected to each other through a physically conventional two wire bus. The wires may be a twisted pair with a 120Ω (nominal) characteristic impedance.

With continued reference to FIG. 1, in some embodiments, a bus element may include a local interconnect network (LIN) bus. A "local interconnect network bus," as used in this disclosure, is a serial network protocol used for communication between components in vehicles. The LIN bus may include a single wire. The LIN bus may support communications up to 19.2 Kbit/s at a bus length of 40 meters. The LIN bus may be a broadcast serial network comprising 16 nodes (one master and typically up to 15 slaves). All messages may be initiated by the master with at most one slave replying to a given message identifier. The master node may also act as a slave by replying to its own messages. Because all communications may be initiated by the master, it may not be necessary to implement collision detection. A "collision," as used in this disclosure, is the situation that occurs when two or more demands are made simultaneously on equipment that can handle only one at any given instant. The master and slaves may be microcontrollers.

With continued reference to FIG. 1, in an embodiment, a network 128 of a plurality of networks 128 may receive command 116 from a flight controller 108 of a plurality of flight controllers 108. As a non-limiting example, network 128a may receive command 116 from flight controller 108a. In another embodiment, a network 128 of the plurality of networks 128 may receive command 116 from a plurality of flight components 108. As a non-limiting example, network 128a may receive command 116 from flight controller 108a and flight controller 128c.

With continued reference to FIG. 1, in some embodiments, a plurality of networks 128 may transmit command 116 to a plurality of effectors 120. In an embodiment, a network of a plurality of networks 128 may transmit command 116 an effector of a plurality of effectors 120. As a non-limiting example, network 128c may transmit command 116 to second effector 123b. In another embodiment, a network of a plurality of networks 128 may transmit command 116 to a plurality of effectors 120. As a non-limiting example, network 128b may transmit command 116 to first effector 120a and second effector 120b.

With continued reference to FIG. 1, in some embodiments, first effector 120a of a plurality of effectors 120 may communicate command from a network of a plurality of networks 128 with second effector 120b using cross-channel communication. As used in this disclosure, "cross-channel communication" is communication of a plurality of effectors that enables the plurality of effectors to communicate over a network that they are not directly connected to. As a non-limiting example, first effector 120a that is connected to network 128a and network 128b may receive information in network 128c from second effector 120b that is connected to network 128b and 128c. In some embodiments, information may be command 116. As another non-limiting example, second effector 120b that is connected to network 128b and network 128c may receive information in network 128a from first effector 120a that is connected to network 128a and network 128b. The cross-channel communication may allow a plurality of effectors 120 to redundantly control flight component 104. "Redundancy in control," as used in this disclosure, is the duplication or mirroring of control in case of failure of control and use as a backup. As a non-limiting example, first effector 120a may be able to control flight component 104 when second effector 120b fails to move the flight component 104. As another non-limiting example, second effector 120b may be able to control flight component 104 when first effector 120a fails to move the flight component 104. "Failure," as used in this disclosure, is nonperformance or inability of a component or system to perform its intended function for a specified time under specified environmental conditions. As a non-limiting example, failure may be generated as a hydraulic piston is not able to extend as it is requested to do so. As another non-limiting example, first effector 120a may fail to actuate due to, for instance and without limitation, if first effector 120a malfunctions, loses communication, or otherwise does not operate as intended.

With continued reference to FIG. 1, in some embodiments, system 100 may include an effector sensor 124. An "effector sensor," as used in this disclosure, is a device that produces an output signal for the purpose of sensing a physical phenomenon of an effector. In some embodiments the effector sensor 124 may be configured to detect a failure of a plurality of effectors 120. The effector sensor 124 may be consistent with a sensor disclosed above. In some embodiments, the effector sensor 124 may generate a failure datum corresponding to the disablement of a plurality of effectors 120. As used in this disclosure, "failure datum" is datum related to a failure of a plurality of effectors. Non-limiting examples of the effector sensor 124 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, an electrical sensor, a temperature sensor, and the like. In some cases, the effector sensor 124 may sense a characteristic as an analog measurement, for instance, yielding a continuously variable electrical potential indicative of the sensed characteristic. As a non-limiting example, an electrical sensor of the effector sensor 124 may detect there is no current going through first effector 120a that controls flight component 104. As another non-limiting example, the electrical sensor of the effector sensor 124 may generate a failure datum corresponding to the disablement of first effector 102a. Second effector 120b, then, may receive the failure datum and control flight component 104.

Referring now to FIGS. 2A-2D, the figures show various partially transparent views of exemplary embodiments of effectors 120 of an exemplary aircraft 248. FIG. 2A shows an exemplary embodiment of system 100 where effectors 120 are disposed within wing 204 of aircraft 248 and attached to a portion of an airframe 208 of aircraft 248. Effectors 120 are each configured to move flight component 104 of aircraft 108 as a function of received attitude command (shown in FIG. 1). Attitude command indicates a desired change in aircraft attitude, as described in this disclosure. Flight component 104 may include aileron 212, rod 256, elevator 224, a rudder 232 of a vertical stabilizer 236, an electric motor, and the like. Effectors 120 are also attached to aileron 212 so as to actuate movement of aileron 212. For example, as indicated by directional arrow 216, at least a portion of aileron 212 may be moved up or down relative to aircraft 248.

Figure 2B:
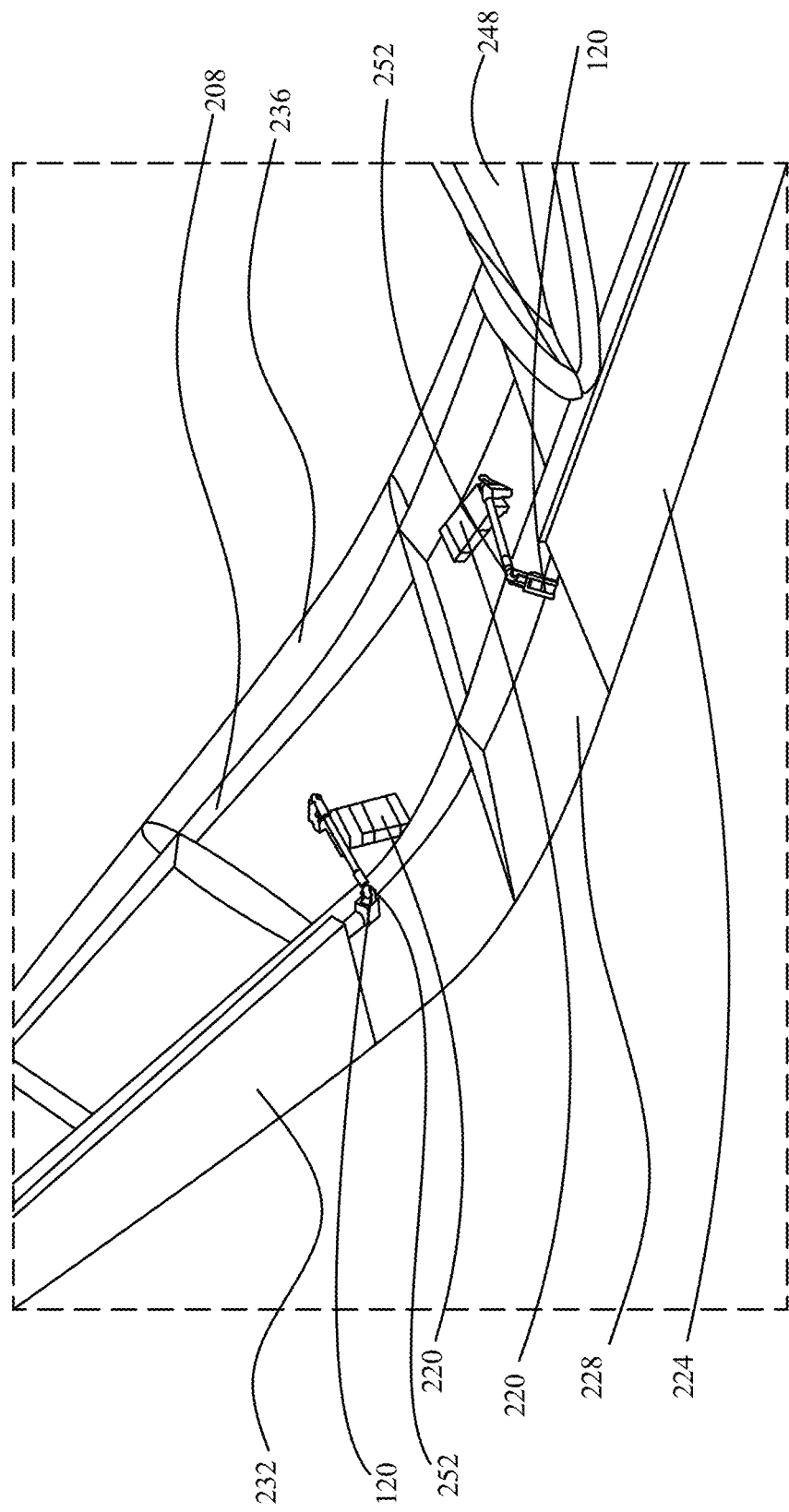
Figure 2C:
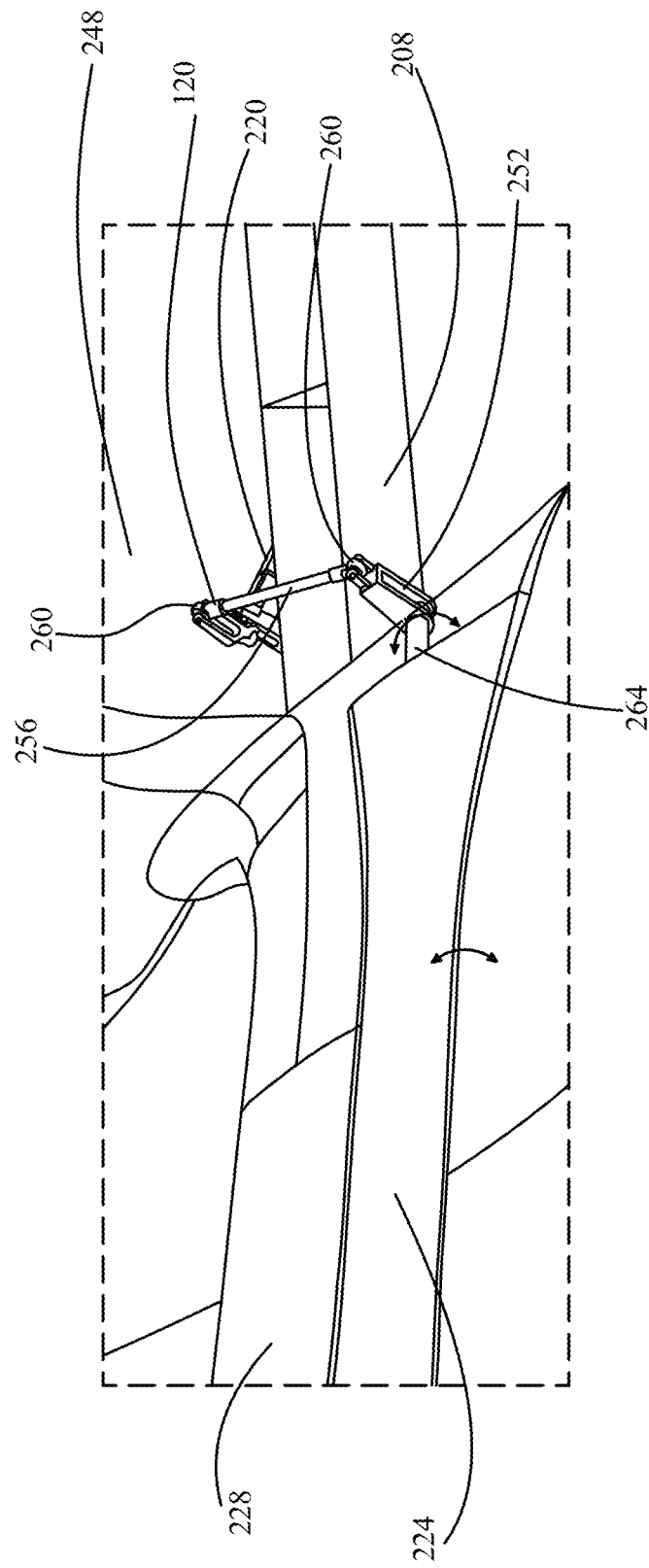

With continued reference to FIGS. 2A-2D, in one or more embodiments, effectors 120 may each include a motor 220, as shown in FIGS. 2A-2C. For example, effectors 120 may each include a stepper motor or servomotor configured to utilize electrical energy into electromagnetic movement of a rotor in a stator. Effectors 120 may each include a system of gears attached to an electric motor configured to convert electrical energy into kinetic energy and mechanical movement through a system of gears. Motor 220 may be connected to an energy source. Motor 220 may be electrically connected to an inverter. Motor 220 may be powered by alternating current produced by the inverter. Each motor 220 may be operatively connected to each effector 120. Motor 220 may operate to move one or more flight components 104, to drive one or more propulsors, or the like. Motor 220 may be driven by direct current (DC) electric power and may include, without limitation, brushless DC electric motors, switched reluctance motors, induction motors, or any combination thereof. A motor may also include electronic speed controllers, inverters, or other components for regulating motor speed, rotation direction, and/or dynamic braking.

With continued reference to FIGS. 2A-2D, in one or more embodiments, each effector 120 may be attached to flight component 104. Each effector 120 may be fixed, pivotally connected, or slidably connected to flight component 104. For example, effector 120 may be pivotally connected to flight component 104 using a pivot joint, such as pivot joint 252 shown in FIGS. 2B-2D. In an exemplary embodiment, pivot joint 252 may be connected to a protrusion, such as protrusion 264, of flight component 104. When flight component is moved by one or more of effectors 120, flight component 104 may be rotated about a longitudinal axis of protrusion 264 such that at least a portion of flight component 104 is raised or lowered relative to outer-mold-lines (OML) 240 of aircraft 248 or raised or lowered to be flush with OML 240 of aircraft 248. Pivot joint may be a ball and socket joint, a condyloid joint, a saddle joint, a pin joint, pivot joint, a hinge joint, or a combination thereof. The pivot joint may allow for movement along a single axis or multiple axes. Effectors 120 may also include a rod 256, which directly or indirectly connects pivot joint 252 to motor 220. Rod 256 may have a rod end 260 that is connected to pivot joint 252. In one or more embodiments, rod 256 may be directly connected to motor 220 or connected to motor 220 via, for example, additional pivot joints.

With continued reference to FIG. 2A-2D, effectors 120 may each have a primary mode wherein each effector 120 may be configured to move flight component 104 of aircraft as a function of attitude command received from flight controller 108. Effectors 120 are configured to move flight component 104 of aircraft 108 in one or both of the two main modes of locomotion of flight component 104. For instance, without limitation, flight component 104 may be lifted, pivoted, or slid relative to OML 240 of aircraft 248 by effectors 120. For example, as shown in FIG. 2A, aileron 212 may be moved up or down relative to aircraft (as indicated by directional arrow 216) by effectors 120. In another example, an elevator 224 of a horizontal stabilizer 228 may be moved up or down relative to aircraft 248 by effectors 120, as shown in FIGS. 2B and 2C. In another example, a rudder 232 of a vertical stabilizer 236 may be moved left or right relative to aircraft 248 by effectors 120, as shown in FIG. 2B. The electronic signals from flight controller 108 or flight controller 108 may be translated to flight component 104. For instance, without limitation, attitude command from flight controller 108 or flight controller 108 may be translated to flight component 104. In one or more embodiments, flight component 104 may include an aerodynamic surface. The aerodynamic surface disclosed herein may be consistent with a control surface disclosed with respect to FIG. 1. In one or more exemplary embodiments, the aerodynamic surface may be an aileron, an edge slat, an elevator, a rudder, balance and anti-balance tabs, flaps, spoilers, a trim, or a mass balance.

Figure 2D:
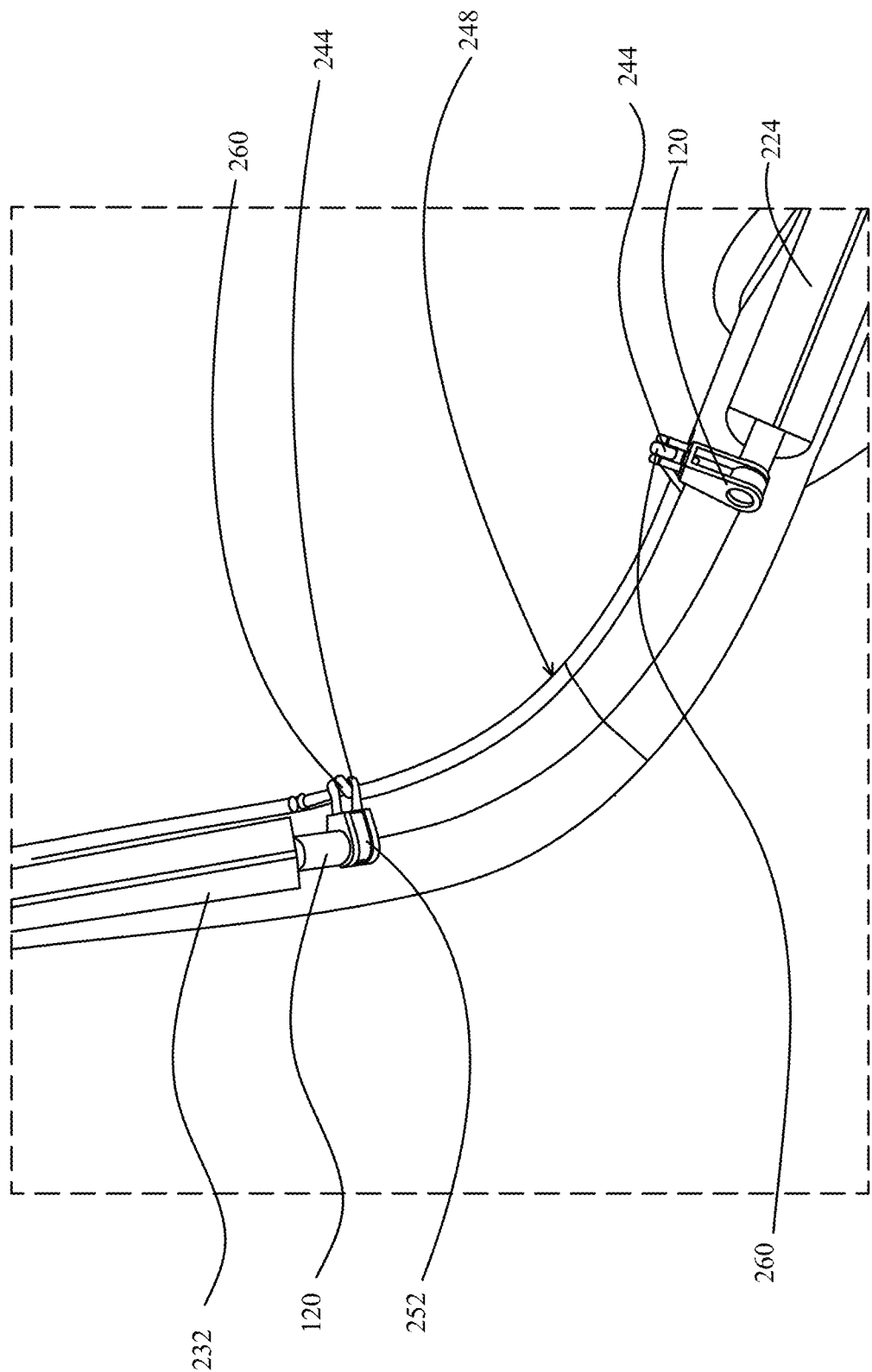

With continued reference to FIGS. 2A-2D, in one or more embodiments, at least one of plurality of effectors 120 may be enclosed in an outer-mold-lines (OML) 240 of aircraft, as shown in FIGS. 2A-2C. In other embodiments, at least a portion 244 of at least one of plurality of effectors 120 protrudes through OML 240 of aircraft 248, as shown in FIG. 2D. Furthermore, protruding portion 244 of at least one plurality of effectors 120 may be oriented relative to the OML so as to minimize drag.

Figure 3:
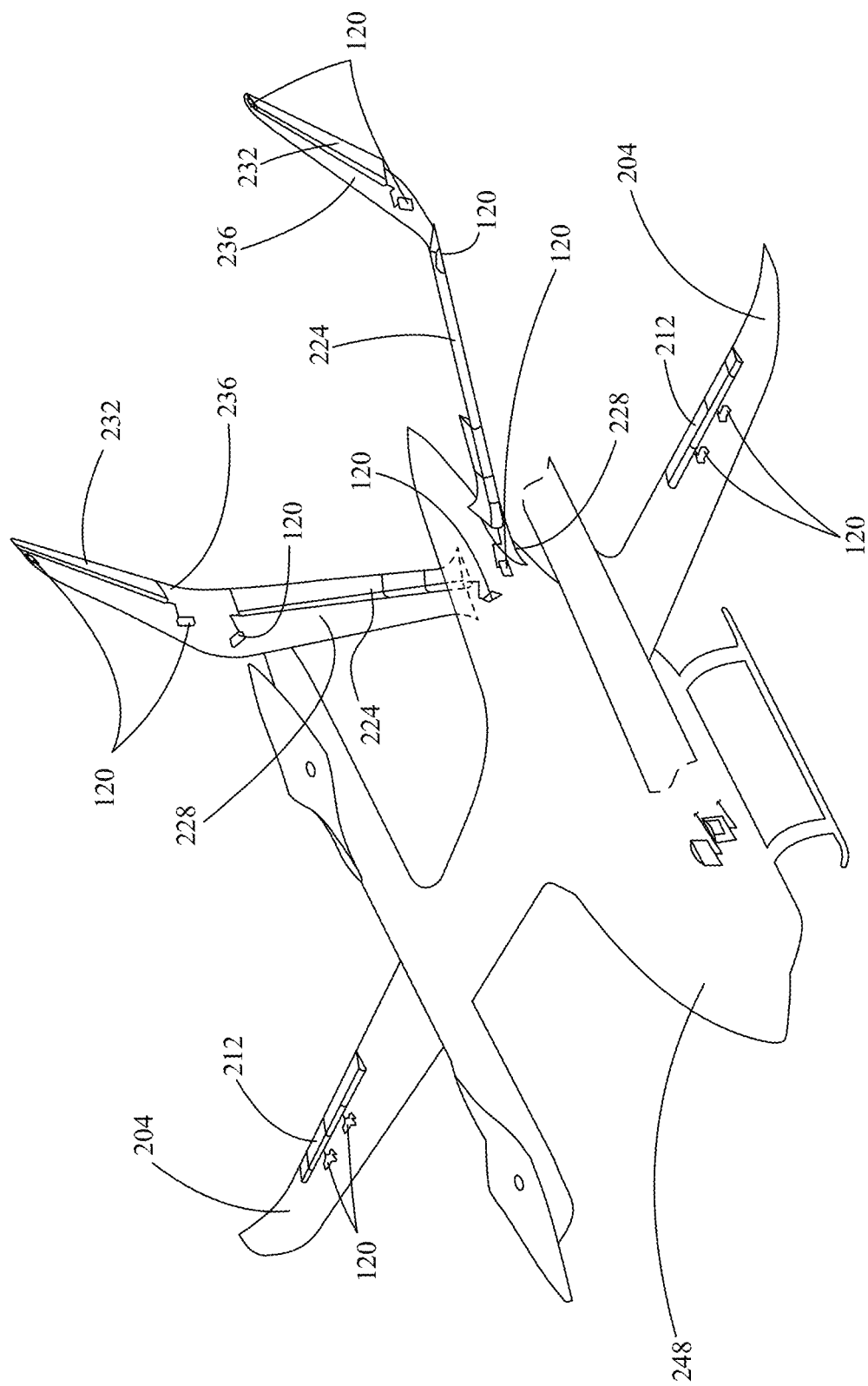
FIG. 3 is a diagrammatic representation of an exemplary aircraft in accordance with aspects of the invention.

Referring now to FIG. 3, the figure shows exemplary aircraft 248 with multiple pluralities of effectors 120 located in various locations and attached to various flight components 104 of aircraft 248. For example, plurality of effectors 120 are attached to and move ailerons 212 of wings 204. Plurality of effectors 120b are attached and move elevators 224 of horizontal stabilizers 228. Plurality of ailerons are each attached to rudders 232 of vertical stabilizers 236. Though only two actuators are shown in each plurality of effectors 120, more than two actuators may be used in each plurality of effectors 120 without changing the scope of the invention, as understood by one skilled on the art.

With continued reference to FIG. 3, in one or more embodiments, aircraft 248 may be an electric aircraft. The electric aircraft may include a vertical takeoff and landing aircraft (eVTOL). As used in this disclosure, a vertical take-off and landing (eVTOL) aircraft is one that can hover, take off, and land vertically. In some cases, an electric vehicle or aircraft may include an energy source configured to power at least a motor configured to move the electric vehicle or aircraft. As used in this disclosure, an "electric aircraft" is an electrically powered aircraft. In some embodiments, electric aircraft may be powered by one or more electric motors or the like. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In some embodiments, electric aircraft may include electric vertical takeoff and landing (eVTOL) aircraft. A "vertical take-off and landing (eVTOL) aircraft," as used in this disclosure, is one that can hover, take off, and land vertically.

With continued reference to FIG. 3, in some embodiments, an aircraft may include a fly-by-wire aircraft. "Fly-by-Wire," also called "FBW," as used in this disclosure, is a fight control system which uses computers to process the flight control inputs made by the pilot or autopilot, and send corresponding electrical signals to the flight control surface actuators. The movements of flight controls may be converted to electronic signals transmitted by wires, and flight control computers may determine how to move the actuators at each control surface to provide the ordered response.

Figure 4:
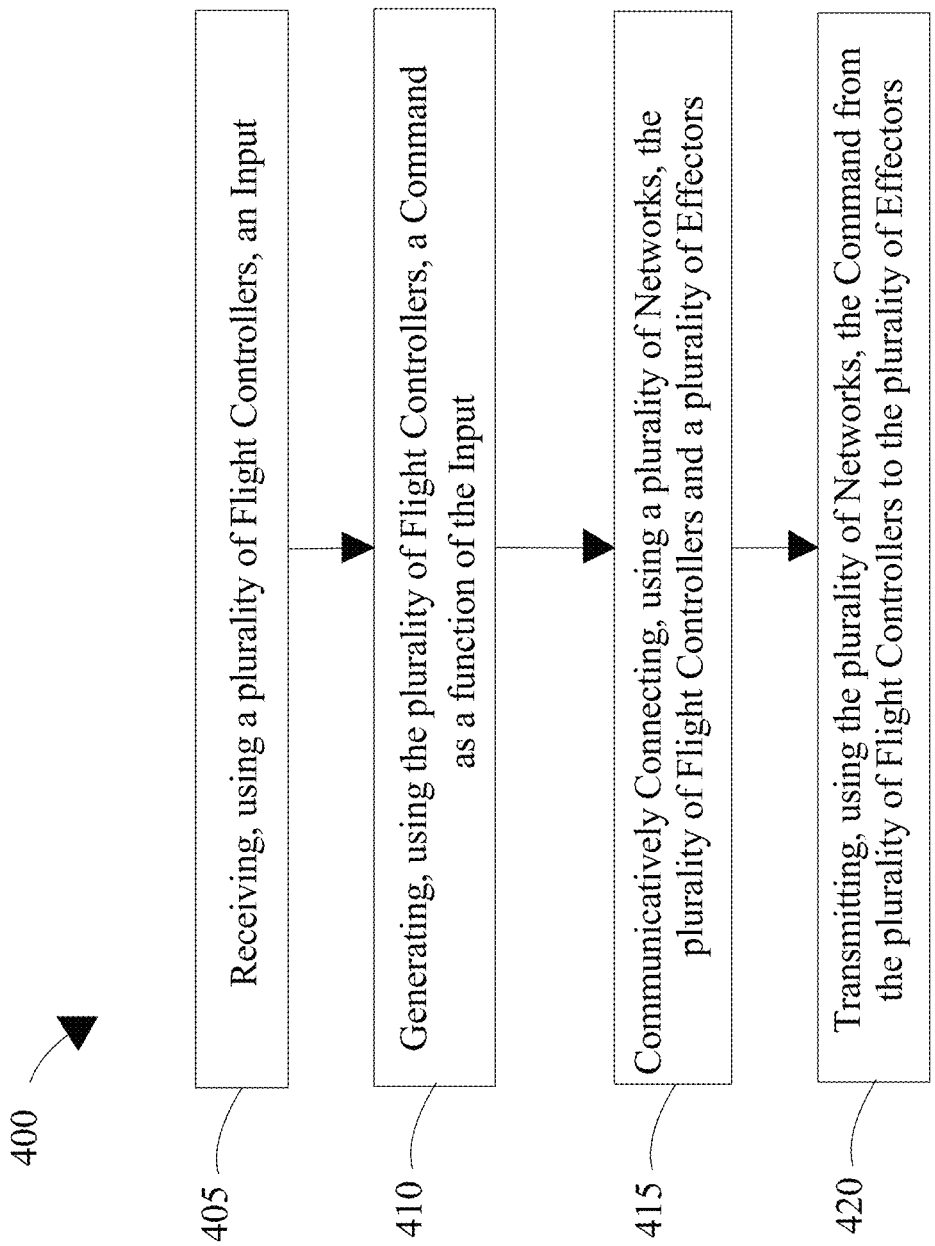
FIG. 4 is a flow diagram illustrating a method of cross-channel communication for effectors of an electric aircraft in accordance with aspects of the invention.

Referring now to FIG. 4, an exemplary flow diagram of method 400 of cross-channel communication for effectors of an electric aircraft is shown. Method 400 includes step 405 of receiving, using a plurality of flight controllers, an input. The electric aircraft may include a fly-by-wire aircraft. This may be implemented as disclosed with reference to FIGS. 1-3.

With continued reference to FIG. 4, method 400 includes step 410 of generating, using the plurality of flight controllers, a command as a function of the input. The command may include a command that is manually put by a pilot. This may be implemented as disclosed with reference to FIGS. 1-3.

With continued reference to FIG. 4, method 400 includes step 415 of communicatively connecting, using a plurality of network devices, the plurality of flight controller and a plurality of effectors. In some embodiments, the plurality of networks is a controller area network (CAN) bus. In some embodiments, a network of the plurality of networks is communicatively connected to the plurality of effectors. This may be implemented as disclosed with reference to FIGS. 1-3.

With continued reference to FIG. 4, method 400 includes step 420 of transmitting, using the plurality of network devices, the command from the plurality of flight controllers to the plurality of effectors. In some embodiments, the plurality of effectors comprises a first effector and a second effector, wherein the first effector communicates with the second effector with cross-channel communication. In some embodiments, the plurality of effectors redundantly controls the flight component. In some embodiments, the first effector controls the flight component if the second effector fails to control the flight component. In some embodiments, step 420 may include detecting, using a sensor, that the first effector is disabled and generating, using the sensor, a failure datum corresponding to the disablement of the first effector. In some embodiments, the flight component may be a propulsor and the plurality of effectors may be an inverter, wherein the inverter controls an electric motor of the propulsor. This may be implemented as disclosed with reference to FIGS. 1-3.

Figure 5:
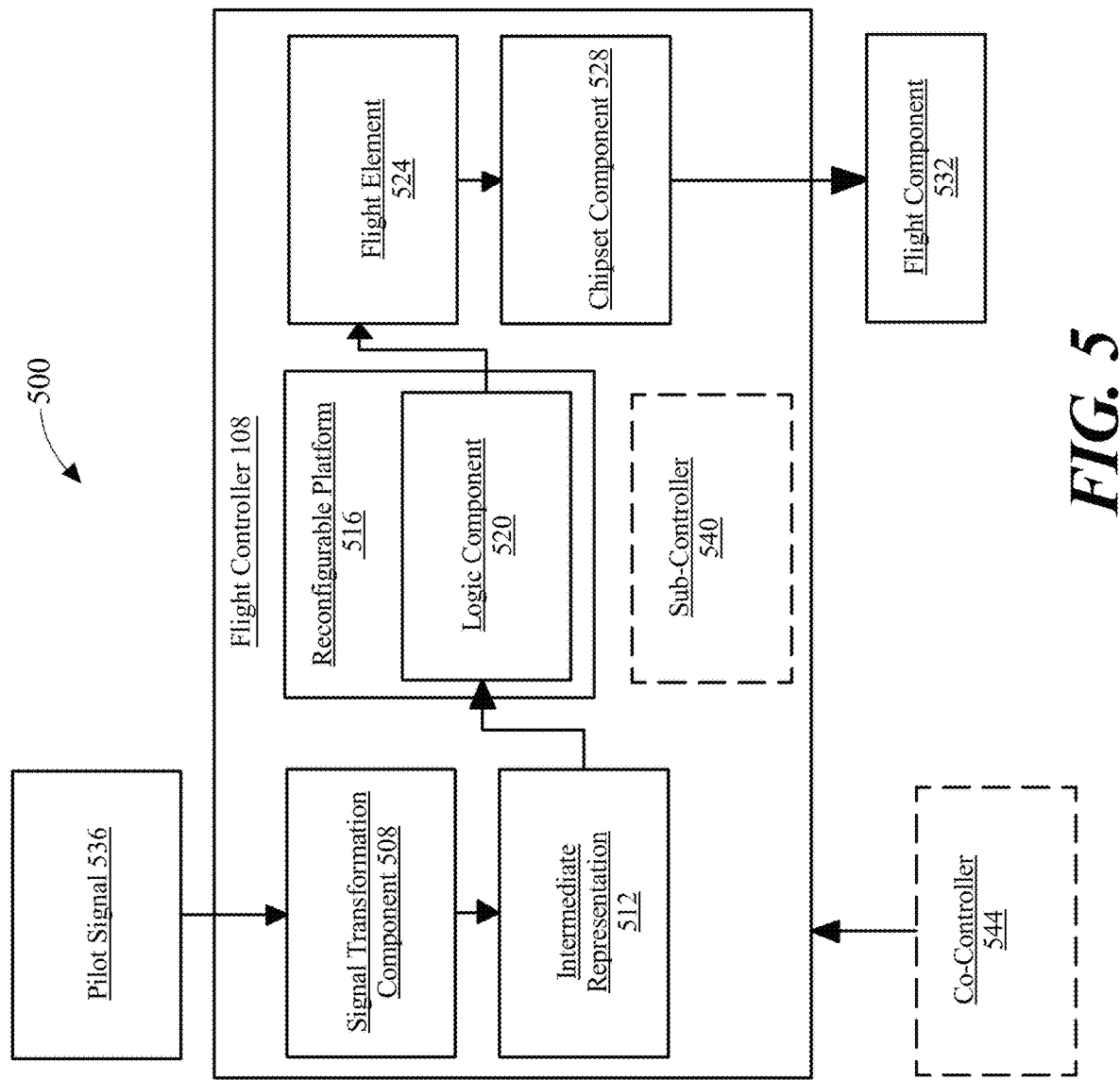
FIG. 5 is a block diagram illustrating an exemplary flight controller in accordance with aspects of the invention.

Referring now to FIG. 5, an exemplary embodiment of flight controller 108 is illustrated. In an embodiment, flight controller 108 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital converters that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

With continued reference to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 108. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri Hocquenghuem (BCH) coding, multidimensional parity-check coding, and/or Hamming codes. An ECC may alternatively or additionally be based on a convolutional code.

With continued reference to FIG. 5, flight controller 108 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

With continued reference to FIG. 5, reconfigurable hardware platform 516 may include a logic component 520. As used in this disclosure a "logic component" is a component that executes instructions on output language. For example, and without limitation, the logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a Floating Point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 108. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

With continued reference to FIG. 5, flight controller 108 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. In some embodiments, flight component 532 may be adjusted to affect one or more flight elements. Flight component 532 herein may be consistent with flight component 104. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

With continued reference to FIG. 5, in some embodiments, flight controller 108 may be configured to generate an autonomous function. As used in this disclosure an "autonomous function" is a mode and/or function of flight controller 108 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 108 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 108 will control the ailerons and/or rudders. As used in this disclosure "non-autonomous mode" is a mode that denotes a pilot will control aircraft and/or maneuvers of aircraft in its entirety.

With continued reference to FIG. 5, flight controller 108 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. Pilot signal 536 herein may be consistent with command 116 disclosed with respect to FIG. 1. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 108 to control and/or maintain a portion of aircraft, a portion of the flight plan, the entire aircraft, and/or the entire flight plan. As a further non-limiting example, pilot signal 536 may include an implicit signal, wherein flight controller 108 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

With continued reference to FIG. 5, autonomous machine-learning model may include one or more autonomous machine-learning processes such as supervised, unsupervised, or reinforcement machine-learning processes that flight controller 108 and/or a remote device may or may not use in the generation of autonomous function. As used in this disclosure "remote device" is an external device to flight controller 108. Additionally or alternatively, the autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

With continued reference to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors.

Autonomous training data may be received as a function of user-entered valuations of flight elements, pilot signals, simulation data, and/or autonomous functions. Flight controller 108 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

With continued reference to FIG. 5, flight controller 108 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote devices and/or FPGA may perform the autonomous machine-learning process using autonomous training data to generate autonomous function and transmit the output to flight controller 108. Remote devices and/or FPGA may transmit a signal, bit, datum, or parameter to flight controller 108 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 108 as a software update, firmware update, or corrected autonomous machine-learning model. For example and without limitation, autonomous machine learning model may utilize a neural net machine-learning process, wherein the updated machine-learning model may incorporate a gradient boosting machine-learning process.

With continued reference to FIG. 5, flight controller 108 may include, be included in, and/or communicate with a mobile device such as a mobile telephone or smartphone. Further, flight controller 108 may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

With continued reference to FIG. 5, in some embodiments, flight controller 108 may include a master bus controller. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

With continued reference to FIG. 5, flight controller 108 may include, but is not limited to, for example, a cluster of flight controllers in a first location and a second flight controller or cluster of flight controllers in a second location. Flight controller 108 may include one or more flight controllers dedicated to data storage, security, distribution of traffic for load balancing, and the like. Flight controller 108 may be configured to distribute one or more computing tasks as described below across a plurality of flight controllers, which may operate in parallel, in series, redundantly, or in any other manner used for distribution of tasks or memory between computing devices. For example, and without limitation, flight controller 108 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, the control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software. In another embodiment, control algorithm may be configured to produce a segmented control algorithm. As used in this disclosure a "segmented control algorithm" is a control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

With continued reference to FIG. 5, a control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, a control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, a communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

With continued reference to FIG. 5, flight controller 108 may also be implemented using a "shared nothing" architecture in which data is cached at the worker, in an embodiment, this may enable scalability of aircraft and/or computing device. Flight controller 108 may include a distributer flight controller. As used in this disclosure a "distributer flight controller" is a component that adjusts and/or controls a plurality of flight components as a function of a plurality of flight controllers. For example, the distributor flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 5, a node may include, without limitation, a plurality of inputs xi that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more input y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

With continued reference to FIG. 5, flight controller may include a sub-controller 540. As used in this disclosure a "sub-controller" is a controller and/or component that is part of a distributed controller as described above; for instance, flight controller 108 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

With continued reference to FIG. 5, flight controller may include a co-controller 544. As used in this disclosure a "co-controller" is a controller and/or component that joins flight controller 108 as components and/or nodes of a distributer flight controller as described above. For example, and without limitation, co-controller 544 may include one or more controllers and/or components that are similar to flight controller 108. As a further non-limiting example, co-controller 544 may include any controller and/or component that joins flight controller 108 to distributer flight controller. As a further non-limiting example, co-controller 544 may include one or more processors, logic components and/or computing devices capable of receiving, processing, and/or transmitting data to and/or from flight controller 108 to distributed flight control system. Co-controller 544 may include any component of any flight controller as described above. Co-controller 544 may be implemented in any manner suitable for implementation of a flight controller as described above.

With continued reference to FIG. 5, flight controller 108 may be designed and/or configured to perform any method, method step, or sequence of method steps in any embodiment described in this disclosure, in any order and with any degree of repetition. For instance, flight controller 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
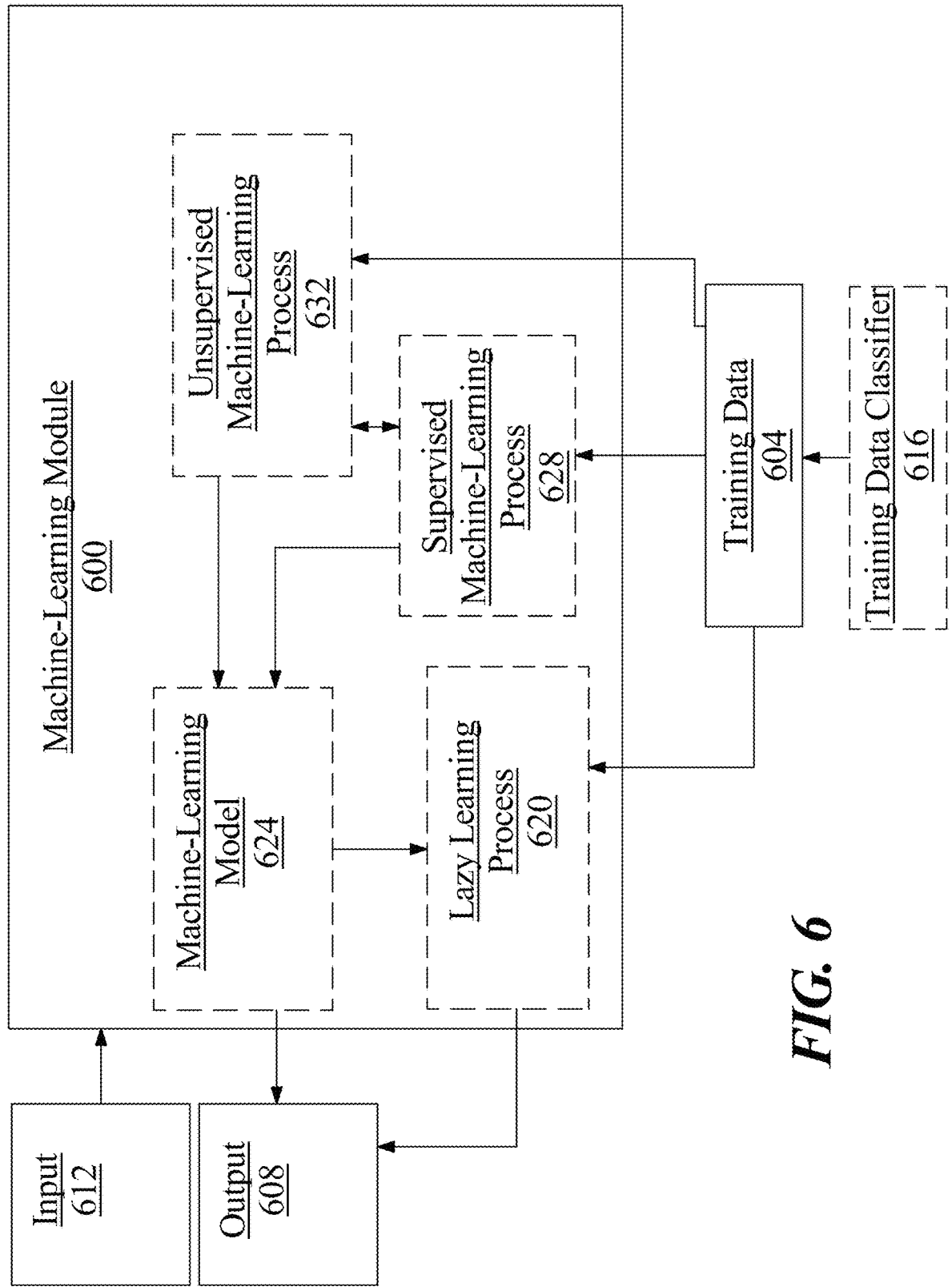
FIG. 6 is a block diagram illustrating an exemplary machine-learning module that can be used to implement any one or more of the methodologies disclosed in this disclosure and any one or more portions thereof in accordance with aspects of the invention.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

With continued reference to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 6, alternatively or additionally, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

With continued reference to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a process whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

With continued reference to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With continued reference to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include the least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 6, machine-learning algorithms may include, without limitation, linear discriminant analysis. The machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described in this disclosure may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described in this disclosure. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used in this disclosure, is intended to include a single medium as well as a collection of physically separate media, such as, for example, a collection of compact discs or one or more hard disk drives in combination with a computer memory. As used in this disclosure, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described in this disclosure.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
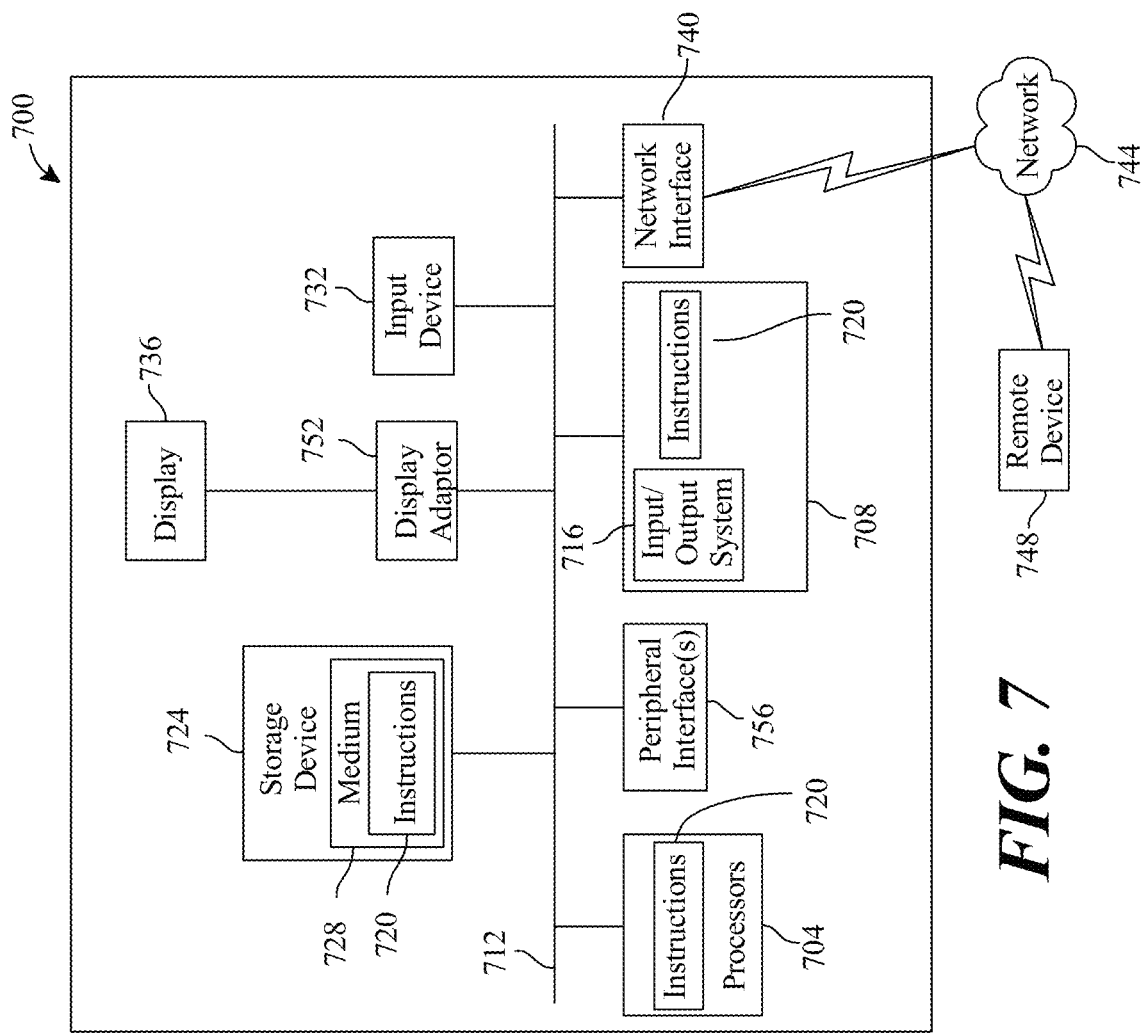
FIG. 7 is a block diagram of a computing system that can be used to implement any one or more of the methodologies disclosed in this disclosure and any one or more portions thereof in accordance with aspects of the invention.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for cross-channel communication for effectors in an electric aircraft, wherein the system comprises:
   a flight component of an electric aircraft;
   a plurality of effectors, wherein the plurality of effectors is configured to control the flight component and comprises a first effector and a second effector, wherein the first effector communicates with the second effector with cross-channel communication;
   a plurality of flight controllers communicatively connected to the plurality of effectors, wherein the plurality of flight controllers is configured to:
     receive an input;
     generate a command as a function of the input; and
     transmit the command to the plurality of effectors; and
   a plurality of networks communicatively connected to the plurality of effectors and the plurality of flight controllers, wherein the plurality of networks is configured to:
     receive the command from the plurality of flight controllers; and
     transmit the command to the plurality of effectors.

2. The system of claim 1, wherein the electric aircraft is a fly-by-wire aircraft.

3. The system of claim 1, wherein the flight component comprises a control surface of the electric aircraft.

4. The system of claim 1, wherein the plurality of networks comprises a controller area network (CAN) bus.

5. The system of claim 1, wherein:
   the first effector is configured to receive the command from a first network of the plurality of networks and a second network of the plurality of networks; and
   the second effector is configured to receive the command from the second network of the plurality of networks and a third network of the plurality of networks.

6. The system of claim 5, wherein:
   the first effector is configured to receive the command from the third network of the plurality of networks from the second effector using the cross-channel communication; and
   the first effector is not directly connected to the third network of the plurality of networks.

7. The system of claim 1, wherein a network of the plurality of networks is communicatively connected to the plurality of effectors.

8. The system of claim 1, further comprising a sensor, wherein the sensor is configured to:
   detect that the first effector is disabled; and generate a failure datum corresponding to the disablement of the first effector.

9. The system of claim 1, further comprising:
the flight component comprises an electric motor; and
the plurality of effectors comprises an inverter, wherein the inverter controls the electric motor.

10. A method of cross-channel communication for effectors in an electric aircraft, wherein the method comprising:
receiving, using a plurality of flight controllers, an input;
generating, using the plurality of flight controllers, a command as a function of the input;
communicatively connecting, using a plurality of networks, the plurality of flight controller and a plurality of effectors comprising a first effector and a second effector, wherein the first effector communicates with the second effector with cross-channel communication; and
transmitting, using the plurality of networks, the command from the plurality of flight controllers to the plurality of effectors.

11. The method of claim 10, wherein the electric aircraft is a fly-by-wire aircraft.

12. The method of claim 10, wherein the flight component comprises a control surface of the electric aircraft.

13. The method of claim 10, wherein the plurality of networks comprises a controller area network (CAN) bus.

14. The method of claim 10, further comprising:
receiving, by the first effector, the command from a first network of the plurality of networks and a second network of the plurality of networks; and
receiving, by the second effector, the command from the second network of the plurality of networks and a third network of the plurality of networks.

15. The method of claim 14, further comprising receiving, by the first effector, the command from the third network of the plurality of networks from the second effector using the cross-channel communication, wherein the first effector is not directly connected to the third network of the plurality of networks.

16. The method of claim 10, wherein a network of the plurality of networks is communicatively connected to the plurality of effectors.

17. The method of claim 10, further comprising:
detecting, using a sensor, that the first effector is disabled; and
generating, using the sensor, a failure datum corresponding to the disablement of the first effector.

18. The method of claim 10, further comprising:
the flight component comprises a propulsor; and
the plurality of effectors comprises an inverter, wherein the inverter controls an electric motor of the propulsor.

* * * * *